United States Patent Office 3,194,280
Patented July 13, 1965

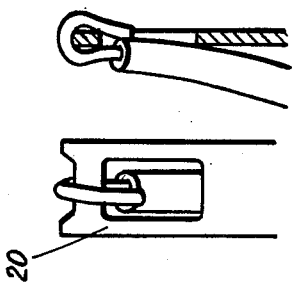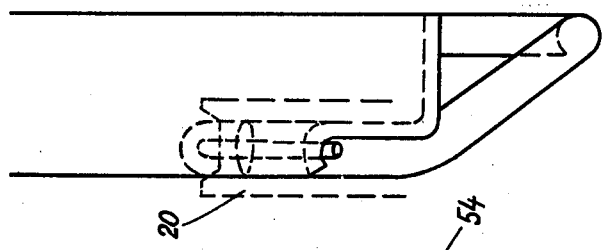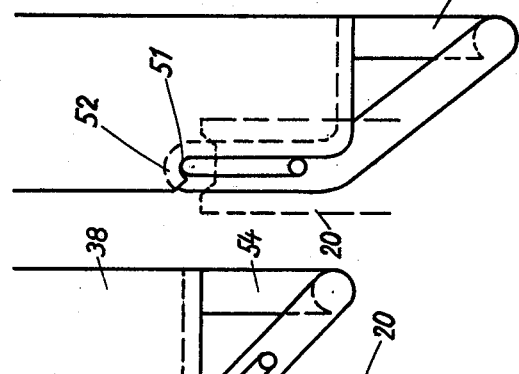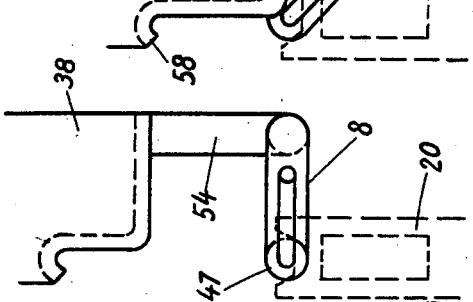
INVENTORS
FOLKE TEODOR MOGESTAD
ANDERS OSSIAN JÖRGENSEN
RUNE NILS ANDERS THYSK
ATTORNEYS

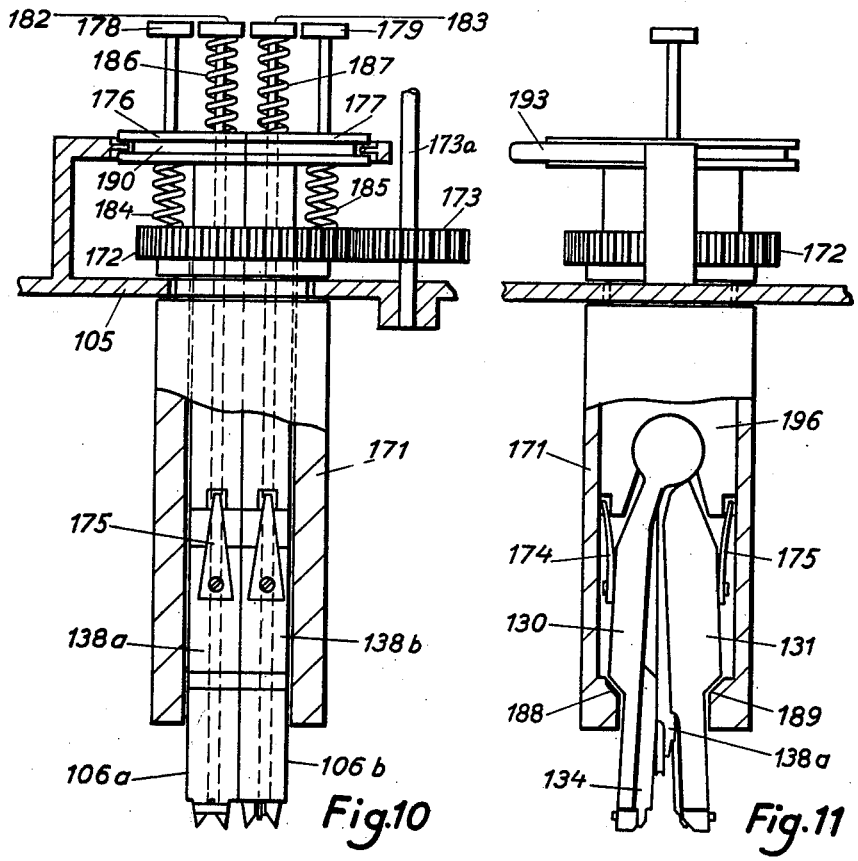
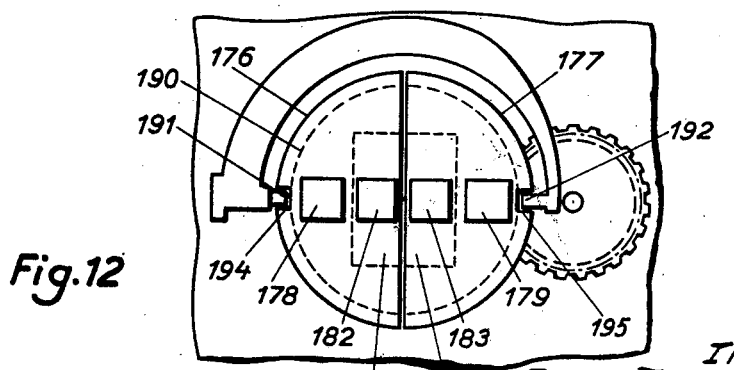

3,194,280
WIRING TOOL
Folke Teodor Mogestad, Pingstvagen 8, Hagersten, Sweden; Anders Ossian Jörgensen, Stavgardsgatan 103, Bromma, Sweden; and Rune Nils Anders Thysk, Langbrovagen 77, Alvsjo, Sweden
Filed Aug. 21, 1962, Ser. No. 218,404
Claims priority, application Sweden, Nov. 10, 1958, 10,396/58
6 Claims. (Cl. 140—93)

The present application is a continuation-in-part of application Serial No. 851,795, filed November 9, 1959, and now abandoned.

This invention relates to a wiring tool, specially for use in controlled machinery for connecting wires between terminals of a mounted array of electrical apparatus units, for instance telephone relays and the like. The object of the invention is to provide a tool suitable for attaching wires to soldering terminals or tags where the soldering of all connections is to be carried out in a later step of the wiring process.

The tool according to the invention is designed to grasp the end portions of the wire between two die halves and to bend the wire in a plane approximately perpendicular to the longitudinal direction of the soldering terminal or tag. By means of the tool the bent end portion of the wire, while held between the die halves, is turned so that it grasps around the edge of the soldering tag. By pushing the tool onto the tag, the end portion of the wire is squeezed around the end of the tag.

Figure 1:
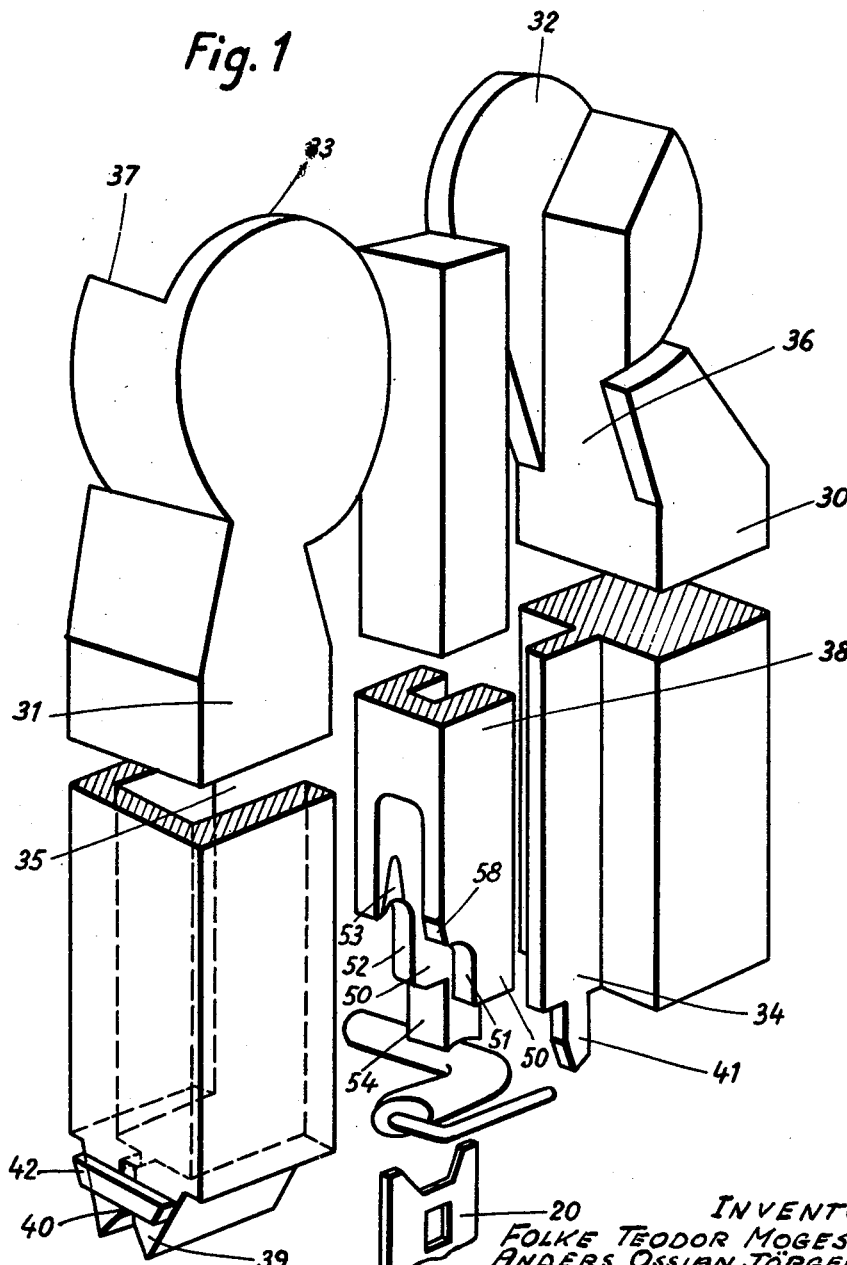

The invention will be explained with reference to the enclosed drawing in which FIG. 1 shows an exploded view of the tool; FIGS. 2–9 show the functioning of the tool in seven different phases during the shaping of the wire; FIG. 10 shows, partly in section, an elevational side view of the wire shaping tool assembly, similar to that of FIG. 1 but more in detail; FIG. 11 is an elevational side view of FIG. 10 turned through an angle of 90°; and FIG. 12 is a plan view of FIG. 10.

Figure 2:
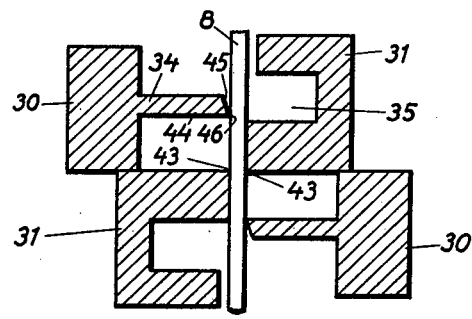

FIG. 1 shows the wire shaping tool consisting of three members 30, 31 and 38. The two die halves 30, 31 are at their ends 32, 33 pivotably supported by an exterior bearing 196 (see FIG. 11). The member 38 passes through the center of said bearing in recesses 36 and 37 of the die halves so that it is displaceable longitudinally in said recesses independently of the relative position of the die halves. A longitudinal ridge 34 on the one die half 30 is situated in a recess 35 in the other die half 31. By swinging the die halves in relation to each other the ridge may be brought outside of the recess, in which condition a wire may be placed between the two die halves as shown in FIG. 2. In the open condition of the die halves the member 38 will be in a retracted position in the interspace between the recesses 36 and 37 of the die halves. In closed condition of the die halves the ridge 34 is situated in the recess 35 in such a manner that there is an interspace between the ridge and the inner wall surfaces of said recess. This interspace is of such a size that its cross section is filled up by the wire in bent and partly stripped condition and that the middle portion 38 of the tool may move freely in the interspace. The die half 31 is at its lower end provided with a wedge-shaped portion 39 which has the purpose of moving aside the soldering tags at both sides of the one soldering tag to which the wire is to be fastened. The end portion is provided with a groove 40, the purpose of which is to guide the soldering tag and the bent wire held in the tool in such a way in relation to each other that they are properly positioned relatively to each other in a direction perpendicular to the plane of the soldering tag. Furthermore, the die halves 30 and 31 respectively are provided with guiding edges 41 and 42 respectively which likewise guide the soldering tag and the wire so that they are properly positioned in relation to each other in the plane of the soldering tag.

Figure 3:
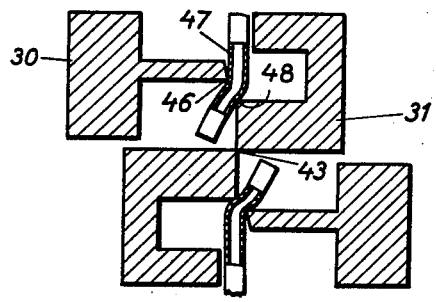
Figure 4:
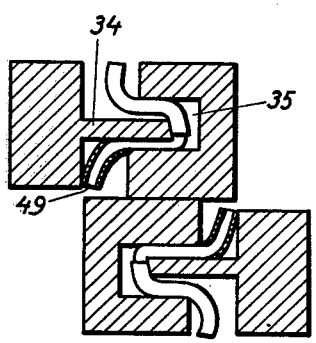

FIGS. 2–4 show the first phase in the bending and cutting operation of the wire, which is carried out by means of the tool. In said figure there are shown two identical tools, each one including two die halves 30, 31, located adjacent each other, which tools co-operate with each other during the mechanized process, although the method according to the invention may be carried out in principle by merely one tool. The wire 8 is before starting the working process placed between the two open die halves according to FIG. 2, in which the die halves are shown only diagrammatically in cross-section. The two identical tools are turned through 180° relatively to each other. The position of the die halves is such that their edges 43 lie close to each other so that upon displacement of the die halves 31 towards each other transversally to the wire 8 these two edges form a cutting tool. As appears from FIG. 2 the die halves of the two identical tools have just been brought nearer each other so much that the wire is held between the die halves without affecting the wire. The ridge 34 of the die half 30 is provided with an edge portion 44 delimited on one side by a slightly sloping surface 45 and ending in a blunted edge 46. This edge has the purpose of making a cut in the insulating coating of the wire. In the condition shown in FIG. 3 the tool has already made part of its movement and the edges 43 of the die halves have cut off the wire. Simultaneously the edge 46 on the one die half has approached the edge 48 on the other die half 31 so that the edge 46 as well as the oppositely situated edge 48 cut into the insulating coating of the wire without damaging the conductor. The die half 30 is elastically displaceable in the longitudinal direction of the wire relatively to the die half 31, so that when the edge 46 is pressed against the wire and the wire opposes the forward movement of the edge 46, this is forced to move in a circular path around the edge 48 along the wire to the position shown in FIG. 3. The edges 46 and 48 have cut into the plastic coating and hold the wire squeezed. FIG. 4 shows the die halves and the wire during the continued movement. The edge portion 34 has penetrated still deeper into the recess 35 and bent the end of the wire into U-shape. The portion of the plastic insulation of the wire end cannot follow the wire between the die halves as the distance between the latter is such that in the portion of the U-shaped channel, where the wire end is located, there is space only for the non-insulated wire. The plastic insulation is thus removed in form of a sleeve 49, which in the closed position of the two die halves will fall off from the wire end and may be carried away for example by means of a suction device.

The member 38 of the tool according to FIG. 1 constitutes a carrier or a transferring piston and serves to push the U-shaped wire end onto a soldering tag 20. The piston 38 has two parallel blades 50 and is displaceable in the interspace between the ridge 34 and the surrounding surfaces of the recess 35. Both blades 50 are provided with a notch 51 and 52 respectively defined by a straight vertical side and an upper curved side, the one notch 52 extending further upwards than the other 51. On the inner side of the two blades 50 there are grooves 53, only one of which is shown in FIG. 1. The purpose of these grooves will be explained below. The piston 38 is provided with a downwardly projecting end portion 54 with a round recess, so that it may seize the wire from above, and is displaceable in such a way that it may be brought into contact with the U-shaped wire end in order to carry it in the downward direction. FIG. 1 shows the position in which the piston 38 has just come into contact with the wire. The same position is shown in FIG. 5. As appears from FIG. 1 the wire is situated in bent position shown in FIG. 4 between the die halves 30 and 31 and the carrier has just come into contact with the wire by its projecting end portion 54. Upon continued downward movement of the piston, the wire is pushed downwardly, whereby the center part of the U-shaped portion will come into contact with the soldering tag that stops the downward movement of said wire. The other part of the U-shaped portion is pushed further down by the piston as shown in FIG. 6. It is evident that because the center part of said U-shaped portion of the wire is held stationary while the other part is pushed downwardly, there will result a certain prolongation of the leg of the U-shaped wire pushed down by the piston 38. Upon continued downward movement of the piston according to FIG. 7 the notches 51, 52 will come into contact with the legs of the U-shaped wire portion. The notches 51, 52 are so dimensioned that they engage the outer side of the insulated respectively non-insulated leg on either side of the center part, so that the U-shaped portion of the wire is swung round the top of the soldering tag downwardly towards vertical position while the insulated wire part is moved downwardly still further by the projection 54. FIG. 8 shows the end position in which the piston has moved further down. In this position the grooves 53 have been pushed onto the wire legs so as to squeeze the wire onto the soldering tag 20 and the insulated portion of the wire has been further prolongated as appears from FIG. 8. At the same time the edge of the notch 52 has pushed down the plastic layer from the top of the wire loop to make the loop completely free from insulation to facilitate the soldering operation. FIG. 9 shows the soldering tag with the wire end attached to it. The surface 58 of the piston is designed to carry aside a wire already secured on the soldering tag in case several wires are to be secured on the same soldering tag.

Referring now to FIGS. 10 to 12, two tools 106a and 106b are mounted in a holder 171 rotatably mounted in a frame 105. The holder may be rotated by means of gears 172 and 173 and a drive shaft 173a.

Each tool comprises two pivotably mounted die halves 130 and 131 of essentially the same shape as those shown in FIG. 1. The die halves are in the position shown in FIG. 11 held apart by means of springs 174 and 175. Semicircular plates 176 and 177 respectively are provided at the upper end of each tool, each plate mounting a headed stud 178 and 179 respectively. Along the center line of each tool there is mounted a slide 138a and 138b respectively, and these slides mount at their upper ends headed studs 182 and 183 respectively.

The tools 106a and 106b and their slides 138a and 138b are resiliently held in their illustrated or normal positions by means of springs 184 to 187. They may, however, be displaced downwardly by applying pressure to the studs. To effect sequential movements of the tools and slides a suitable conventional cycling device such as a cam device may be used.

In order to cause the tools to close their gaps, when displaced downwardly, oblique surfaces 188 and 189 are provided on the inside of the holder 171, along which the corresponding surfaces on the die halves are sliding.

The die halves mount semi-circular plates 176 and 177 respectively. The plates are each provided with a peripheral groove into which two projections 191 and 192 of a support structure 193 protrude. These projections prevent axial movement of the tools during the rotation of the tool holder, except when the tools are in the position of FIGURE 12. In that position cut out 194 and 195 permit axial displacemnt of the tools.

We claim:
1. A tool for applying and securing a wire to a soldering tag comprising, in combination, a pair of plier-like die halves pivotally supported for pivotal movement relative to each other to close the die halves, one of said die halves having a recess, the other one of said die halves having a ridge shaped projection engageable with said recess, said die halves in response to a pivotal movement toward each other defining a channel shaped cavity therebetween, a slide having a channel shaped cross section corresponding to said projection of the respective die half and engaging said projection supported within said cavity for lengthwise reciprocable movement, said cavity being arranged to receive a wire for bending the same therewithin between the die halves in response to a pivotal movement of said die halves toward each other, said slide in response to a downward movement ejecting the bent end portion of the wire outwardly from said cavity, said slide having a projection turning the bent end portion of the wire about an axis perpendidular to the plane of a soldering tag located in front of the cavity opening during an outward movement of the slide in reference to the die halves, and a pair of laterally spaced apart portions on said slide for grasping said bent end portion of the wire to secure said wire to the soldering tag.

2. A tool as set forth in claim 1, wherein said projection of said one die half includes a first cutting edge, said recess of said other die half defining a second cutting edge, said cutting edges in response to a pivotal movement of said die halves toward each other defining a cutting and stripping device for removing the insulating coating of the wire, and said die halves being displaceable relative to each other so as to be displaced a distance equal to the diameter of the bare wire in response to encountering resistance of the wire during the closing of said die halves.

3. A tool as set forth in claim 1, wherein said laterally spaced portions of the slide include guiding surfaces and squeezing grooves, the guiding surfaces of said portions being arranged to guide the legs of the bent end portion of the wire into the squeezing grooves, and said squeezing grooves being biased toward each other to squeeze said bent end portion upon said soldering tag during said ejecting movement of said slide.

4. A tool as set forth in claim 1, wherein said laterally spaced portions of the slide are further provided with guiding surfaces and squeezing grooves, said guiding surfaces being arranged to guide the legs of the bent end portion of the wire into the squeezing grooves, and said squeezing grooves being biased toward each other so as to squeeze said bent end portion of said wire onto said tag during a continued ejection movement of said slide.

5. A pair of substantially identical tools for connecting wires to spaced apart soldering tags on a panel, each said tool having a pair of relatively movable plier-like die halves, one of said die halves having a recess, the other one of said die halves having a ridge shaped projection engageable with said recess, said die halves in response to a pivotal movement toward each other defining a channel shaped cavity therebetween, a slide of generally channel shaped cross section lengthwise slidable within said cavity, one of said tools being turned 180° with respect to the other to form a continuous gap in an open position, and to simultaneously grip a wire introduced into the gap during a closing movement thereof, the adjacent sides of said tools forming a cutting device for the wire inserted therebetween, whereby said wire is cut during the closing movement of said tools, said die halves of each tool bending a wire end gripped therebetween in response to closing movement thereof to conform to the cross sectional configuration of said cavity, said channel shaped slide ejecting the bent end portion of the wire outwardly from the cavity in response to a longitudinal ejection movement thereof in reference to the die halves, said slide having a projection turning the bent end portion of the wire around an axis perpendicular to the plane of a soldering tag located in front of the cavity opening during the outward movement of said slide in said ejecting direction, and said slide further having a pair of laterally spaced portions relatively movable towards each other for grasping the legs of said bent end portion of the wire to fasten said end portion of said wire to the soldering tag in response to a squeezing action thereupon by movement of said lateral portion toward each other.

6. A pair of tools as set forth in claim 5, wherein one of said tools grips the wire end during the connecting procedure, and the other one of said tools securing the wire end to the tag.

References Cited by the Examiner
UNITED STATES PATENTS
2,591,649   4/52   Whiting _____ 140—106

CHARLES W. LANHAM, *Primary Examiner.*